United States Patent
Koyuncu et al.

(10) Patent No.: US 11,931,699 B2
(45) Date of Patent: Mar. 19, 2024

(54) AQUAPORIN Z INTEGRATED MEMBRANE PRODUCTION METHOD

(71) Applicant: ISTANBUL TEKNIK UNIVERSITESI, Istanbul (TR)

(72) Inventors: Ismail Koyuncu, Istanbul (TR); Reyhan Sengur, Istanbul (TR); Nevin Gul Karaguler, Istanbul (TR); Esra Ates Genceli, Istanbul (TR); Turker Turken, Istanbul (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 455 days.

(21) Appl. No.: 17/277,544

(22) PCT Filed: Sep. 18, 2020

(86) PCT No.: PCT/TR2020/050866
§ 371 (c)(1),
(2) Date: Mar. 18, 2021

(87) PCT Pub. No.: WO2021/066773
PCT Pub. Date: Apr. 8, 2021

(65) Prior Publication Data
US 2022/0274068 A1    Sep. 1, 2022

(30) Foreign Application Priority Data
Oct. 2, 2019 (TR) .................. 2019/15068

(51) Int. Cl.
*B01D 69/12* (2006.01)
*B01D 67/00* (2006.01)
(Continued)

(52) U.S. Cl.
CPC ..... *B01D 69/1251* (2022.08); *B01D 67/0006* (2013.01); *B01D 67/0095* (2013.01);
(Continued)

(58) Field of Classification Search
CPC .............. B01D 69/125; B01D 67/0006; B01D 67/0095; B01D 69/08; B01D 69/1251; B01D 69/144; B01D 71/36; B01D 71/56
See application file for complete search history.

(56) References Cited

U.S. PATENT DOCUMENTS

| 4,039,440 A | 8/1977 | Cadotte |
| 2014/0332468 A1* | 11/2014 | Tang .................. B01D 67/0006 210/490 |

(Continued)

FOREIGN PATENT DOCUMENTS

| CA | 2607371 C | 4/2016 |
| CA | 2897354 C | 3/2019 |

(Continued)

OTHER PUBLICATIONS

Enise Pekgenc, Aquaporin Z Embedded Flat Sheet Nanofiltration Membranes Production, Characterization and Removal of Organic Matter, Jun. 2018. (Year: 2018).*

(Continued)

*Primary Examiner* — Larry W Thrower
(74) *Attorney, Agent, or Firm* — Bayramoglu Law Offices LLC (57) ABSTRACT

Integrating an aquaporin Z protein addition to an outer surface of hollow fiber membranes and a production method of aquaporin Z integrated hollow fiber membranes using different hollow fiber support membranes are provided. The production method includes polymeric, nanocomposite materials. When an aquaporin protein integrated onto reinforced hollow fiber membranes, increase in a mechanical strength and a flux of the reinforced hollow fiber membranes was observed.

1 Claim, 6 Drawing Sheets

(51) Int. Cl.
    *B01D 69/08*     (2006.01)
    *B01D 69/14*     (2006.01)
    *B01D 71/36*     (2006.01)
    *B01D 71/56*     (2006.01)

(52) U.S. Cl.
    CPC ........... *B01D 69/08* (2013.01); *B01D 69/144* (2013.01); *B01D 71/36* (2013.01); *B01D 71/56* (2013.01)

(56) References Cited

U.S. PATENT DOCUMENTS

2015/0144553 A1* 5/2015 Vogel ................ B01D 67/0006 521/53
2015/0273407 A1* 10/2015 Gil .......................... B01D 71/06 530/370

FOREIGN PATENT DOCUMENTS

| CN | 105624183 | A | * | 6/2016 | |
| --- | --- | --- | --- | --- | --- |
| CN | 105624183 | A | | 6/2016 | |
| JP | 2012192408 | A | | 10/2012 | |
| KR | 20140004365 | U | | 1/2014 | |
| KR | 20180078165 | A | * | 7/2018 | ........... B01D 61/002 |
| WO | 2012161662 | A1 | | 11/2012 | |
| WO | 2014063097 | A1 | | 4/2014 | |
| WO | WO-2017030502 | A1 | * | 2/2017 | ......... B01D 67/0006 |
| WO | WO-2018182518 | A1 | * | 10/2018 | .............. A23P 10/30 |

OTHER PUBLICATIONS

Manish Kumar, et al., Highly permeable polymeric membranes based on the incorporation of the functional water channel protein Aquaporin Z, PNAS, 2007, pp. 20719-20724, vol. 104 No. 52.

Enise Pekgenc, Aquaporin Z Embedded Flat Sheet Nanofiltration Membranes Production, Characterization and Removal of Organic Matter, 2018.

Rastislav Varhac, et al., Removal of bound Triton X-100 from purified bovine heart cytochrome bc1, Analytical Biochemistry, 2009, pp. 268-270, vol. 395.

* cited by examiner

AQUAPORIN Z INTEGRATED MEMBRANE PRODUCTION METHOD

CROSS REFERENCE TO THE RELATED APPLICATIONS

This application is the national stage entry of International Application No. PCT/TR2020/050866, filed on Sep. 18, 2020, which is based upon and claims priority to Turkish Patent Application No. 2019/15068, filed on Oct. 2, 2019, the entire contents of which are incorporated herein by reference.

TECHNICAL FIELD

The invention is related to integrating an aquaporin protein addition to the outer surface of hollow fiber membranes and the production method of aquaporin Z integrated membrane using different hollow fiber support membranes comprising polymeric, nanocomposite materials as hollow fiber membranes.

BACKGROUND

The production of thin film composite membranes (TFC) using interfacial polymerization has been developed by Cadotte et al., in the 1970's. A selective layer (varies between 20-200 nm) that enables to separate the porous membrane that acts as support is available in TFC membranes. These membranes express superior selectivity, permeability and mechanical strength properties. Amine and acyl chloride monomers are dissolved in water and in an organic phase and are subjected to reaction in order to produce these membranes with interfacial polymerization and a polyamide layer is formed on the interfacial surface of the reaction. By means of this polyamide layer, water purification is achieved at nanofiltration levels.

Nowadays reverse osmosis membranes have approximately 1-2 L/m²·h·bar permeability and % 99.6 salt rejection. However since high pressure needs to be applied, energy consumptions are around 2 kW·s/m³ and this increases the processing costs of membranes. Due to this reason it is important to produce membranes having high flux and selectivity.

The concept of producing membranes doped with aquaporin was initially conveyed in 2007 by Kumar et al., (2). Since that day, membranes have been processed for nanofiltration, reverse osmosis and forward osmosis processes using flat sheet membranes.

In Table I, the permeability comparison of TO and FO membranes against membranes produced using Aquaporin has been given.

TABLE I

| Water Channel and Permeability Values | |
| --- | --- |
| Water channel | Permeability Value |
| Aquaporin | 167 μm/s/bar |
| TO membrane | 2 μm/s/bar |
| FO membrane | 2.5 μm/s |

Various improvements have been carried out in the prior art, in relation to the production method of aquaporin Z integrated membranes using fiber reinforced membranes.

In the Canadian patent document numbered CA2607371C of the prior art, membranes comprising functional water channels inside lipids having structures similar to cell membranes have been disclosed. The lipid bilayers have been arranged as sandwich structures comprising hydrophilic or hydrophobic support materials. Water purification devices/systems including reverse osmosis filtering devices comprising membranes with functional aquaporins are also described in the document. Moreover the method of preparing water purification membranes is also described.

In the prior art Japanese patent document numbered JP2012192408A, membranes which are similar to sandwich structures and which comprise bi-layer lipids, hydrophilic or hydrophobic support materials are disclosed. Moreover, water purification membrane preparation methods including reverse osmosis filtering devices comprising membranes with functional aquaporins are also described. Additionally, the invention provides lipid membranes that comprise other transmembrane proteins besides aquaporins that comprise porous hydrophobic polymer films.

The Korean patent document numbered KR20140004365U of the prior art, is related to an aquaporin water channel that is equipped with hollow fibers having a fiber membrane modified with composite structures (TFC). The present invention additionally discloses a hollow fiber membrane that has a separation layer modified with a thin film composite (TFC), comprising a polyimide TFC layer therein, instead of fiber. It comprises a water channel that is embedded into a layer or immobilized as a method for directly forming TFC modification on fiber.

In the Canadian patent document numbered CA2897354C of the prior art, a hollow fiber (HF) module that has fibers modified with a thin film composite (TFC) layer comprising aquaporin water channels is mentioned.

When the methods present in the art are examined, it has been noted that an aquaporin Z integrated membrane production method was required, wherein aquaporin integrated membrane is provided by producing only polymeric, nanocomposite and reinforced hollow fibers, where doping of aquaporin to hollow fiber membranes is carried out using polysulfone polymer.

SUMMARY

The aim of the invention is to provide a membrane production method where only polymeric, nanocomposite and reinforced hollow fibers are individually produced and where individual aquaporin doped membrane production is carried out.

Another aim of the invention is to provide a membrane production method where aquaporin integration is carried out on hollow fiber membranes using polysulfone polymer.

Another aim of the invention is to provide a membrane production method where the aquaporin protein is embedded into the liposome.

Another aim of the invention is to provide a membrane production method where membrane flux and strength is increased when aquaporin protein integration is carried out using hollow fiber membranes.

Another aim of the invention is to provide a membrane production method resistant under high pressure, where fluxes that are similar to hollow fiber nanofiltration membrane fluxes are obtained.

BRIEF DESCRIPTION OF THE DRAWINGS

The production method of aquaporin Z integrated membrane using different hollow fiber support membranes car- According to these figures.

DETAILED DESCRIPTION OF THE EMBODIMENTS

Hollow fiber membrane is produced in order to be used as 3 different support layers in the membrane production method subject to the invention. The contents of the membrane dope solution for production is 16% polysulfone, 10% polyvinyl pyrrolidone (Molecular weight: 360 kDa (kilo Daltons)), 74% n-methyl pyrrolidone. 0.01% carbon nanotube (external diameter <8 nm) is used for the nanocomposite doped support layer. The contents of the membrane dope solution for the production of reinforced support layer is 16% polysulfone, 10% polyvinyl pyrrolidone (Molecular weight: 40 kDa (kilo Daltons)), 74% n-methyl pyrrolidone and polyester (PET) textile yarn.

Dioleoylphosphocholine (DOPC) lipid that was dissolved in chloroform for aquaporin protein doping was used and the chloroform that was present inside the solution having 0.1% DOPC concentration by weight has been evaporated in nitrogen medium. Following this 10 mM phosphate buffer solution (PBS) has been added into DOPC lipid. The liposomes have been produced by being vortexed with the rehydration method and 1% aquaporin by weight has been added into the liposomes. 1% dodecylmaltoside (DDM) detergent was added for the aquaporin protein to reconstitute into liposomes more effectively. Detergent added during the reconstitution process was removed by adding biobeads which are consisting of neutral, porous styrene divinylbenzene beads.

The solution has been extruded by a mini extruder by using polytetrafluoroethylene (PTFE) membranes having 200 nm pore size in order to reduce the liposomes that contain aquaporin Z to a similar size. In order to compare the performance of the purified protein, aquaporin protein that was purchased commercially was used.

TABLE II

| Production parameters | Production Parameters | | |
|---|---|---|---|
| | Only polymeric membrane | Nanocomposite membrane | Reinforced membrane |
| Coagulation bath temperature, °C. | 45 | 45 | 45 |
| Air gap distance, cm | 0 | 0 | 0 |
| Take-up speed m/s | 0.105 | 0.105 | 0.033 |
| Membrane dope solution speed, mL/min | 6 | 6 | 1 |
| Inner solution speed, mL/min | 3 | 3 | — |

Parameters that are used in the production of hollow fiber membranes have been given in Table II. An interfacial surface polymerization has been used in order to reconstitute the aquaporin protein into the 3 different support layer. 2% piperazine (PIP) was dissolved in water and 0.2% trimesoyl chloride (TMC) was dissolved in cyclohexane in order to carry our interfacial polymerization. The Aquaporin Z reconstituted DOPC liposomes were prepared at 0.1% concentration was added into the solution with piperazine. The hollow fiber membranes were first immersed into the PIP+ Aquaporin including solution for 2 minutes. Following this the membranes were passed through 1 atm nitrogen gas in order to remove the non-reacted PIP monomers available on the surface from the membrane. After this, the membranes were left in 100% cyclohexane solution for 1 minute and they were then immersed into TMC solution and after they were kept here for 1 minute, they were kept in a drying oven for 5 minutes at 50° C.

TABLE III

The abbreviations of the produced HF NF Membranes

| Type of support layer | The NF membranes that were produced | | | |
|---|---|---|---|---|
| | Only support layer | TFC membrane | Membranes in which purified aquaporin in the study was used | Membranes in which commercial aquaporins were used |
| Only polymeric | p-UF | p-TFC | p-AqpZ | p-com. AqpZ |

TABLE III-continued

The abbreviations of the produced HF NF Membranes

The NF membranes that were produced

| Type of support layer | Only support layer | TFC membrane | Membranes in which purified aquaporin in the study was used | Membranes in which commercial aquaporins were used |
|---|---|---|---|---|
| Nanocomposite Reinforced | CNT-UF r-UF | CNT-TFC r-TFC | CNT-AqpZ r-AqpZ | CNT-com. AqpZ r-com.AqpZ |

Figure 1A:
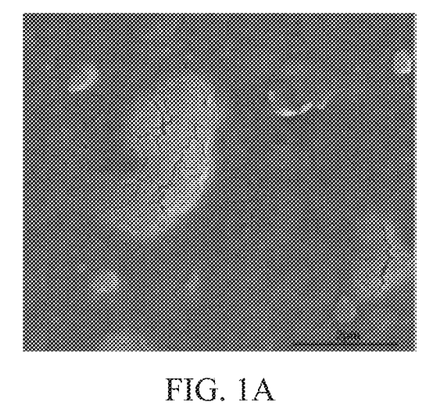
FIG. 1A: View of the surface SEM images of p-UF membranes.
Figure 1B:
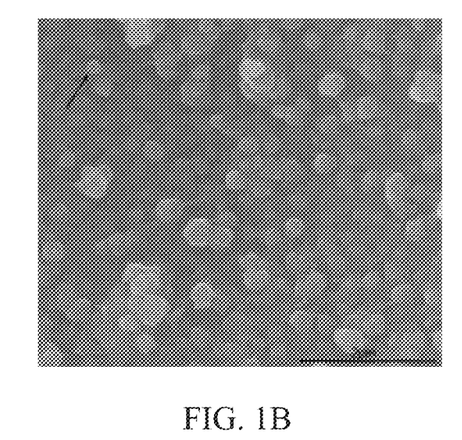
FIG. 1B: View of the surface SEM images of p-AqpZ membranes.
Figure 1C:
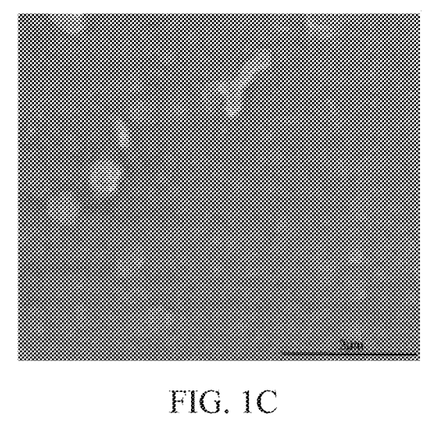
FIG. 1C: View of the surface SEM images of p-TFC membranes.
Figure 1D:
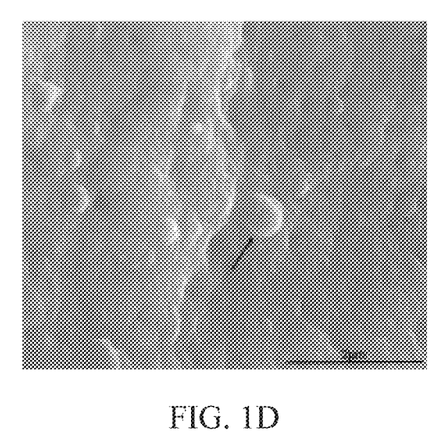
FIG. 1D: View of the surface SEM images of p-com.AqpZ membranes.
Figure 2A:
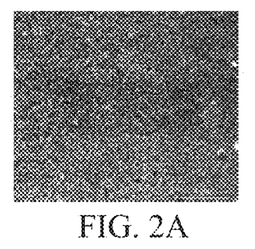
FIG. 2A: View of the surface SEM images of CNT-UF membranes.
Figure 2B:
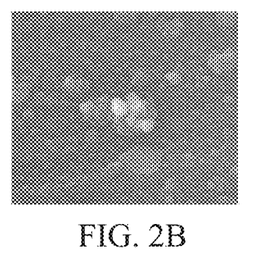
FIG. 2B: View of the surface SEM images of CNT-AqpZ membranes.
Figure 2C:
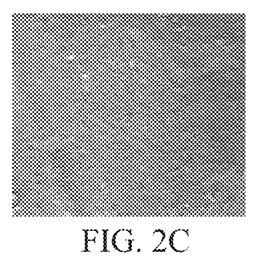
FIG. 2C: View of the surface SEM images of r-UF membranes.
Figure 2D:
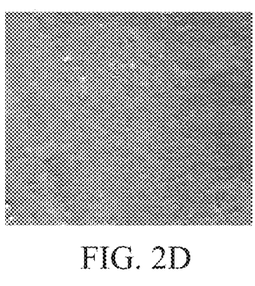
FIG. 2D: View of the surface SEM images of r-AqpZ membranes.
Figure 2E:
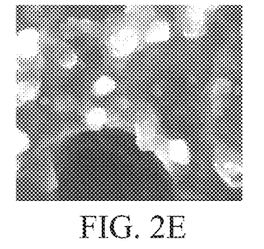
FIG. 2E: View of the surface SEM images of CNT-TFC membranes.
Figure 2F:
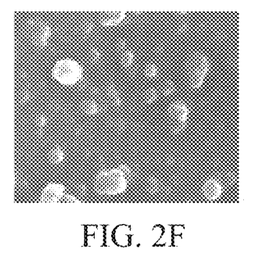
FIG. 2F: View of the surface SEM images of CNT-com.AqpZ membranes.
Figure 2G:
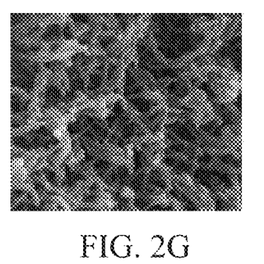
FIG. 2G: View of the surface SEM images of r-TFC membranes
Figure 2H:
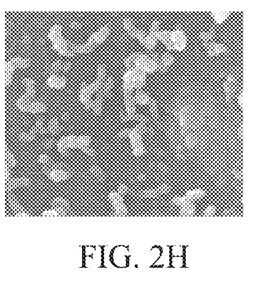
FIG. 2H: View of the surface SEM images of r-com.AqpZ membranes.
Figure 3:
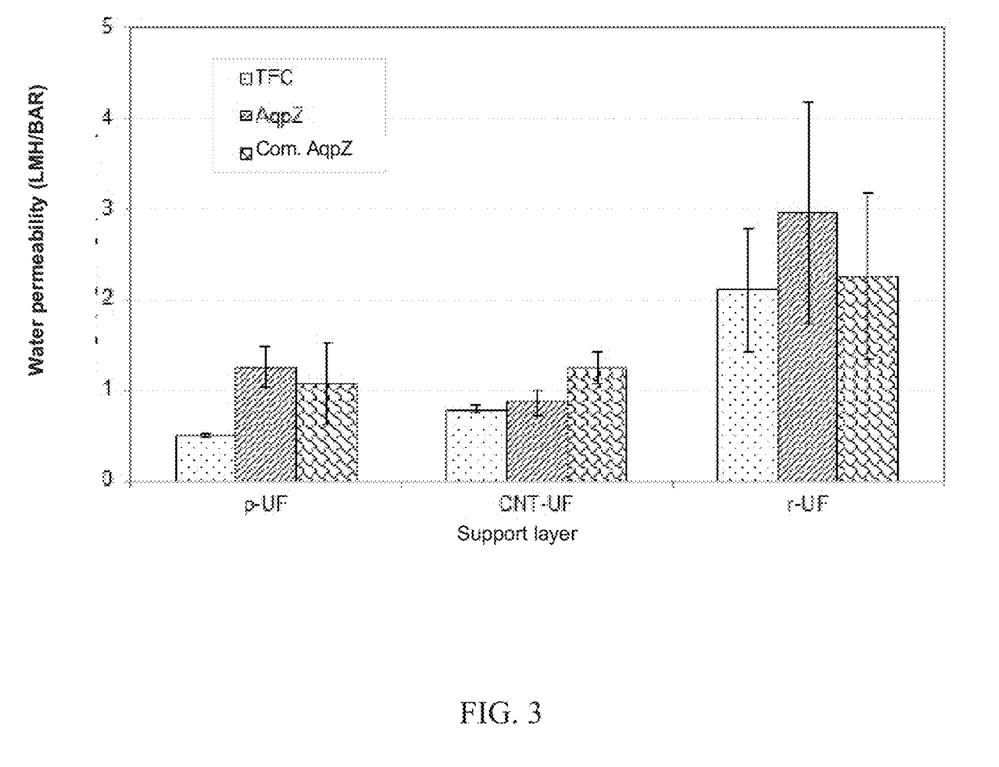
FIG. 3: Graphical view of the water permeabilities belonging to the produced membranes.
Figure 4A:
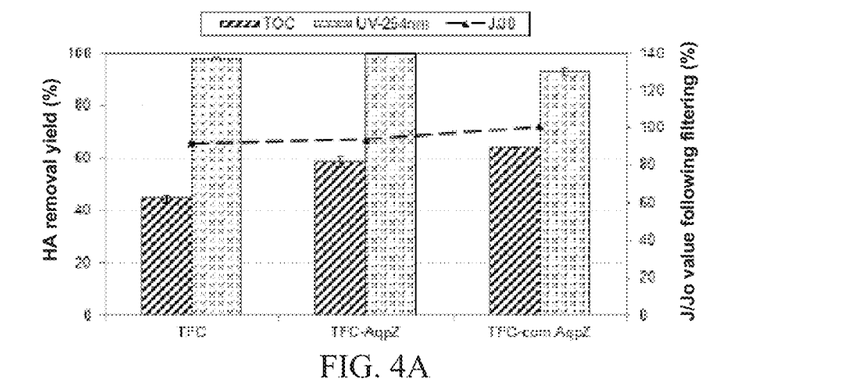
FIG. 4A: View of the flux changes depending on membrane contamination and organic agent retention belonging to TFC, TFC-AqpZ and TFC-com.AqpZ membranes.
Figure 4B:
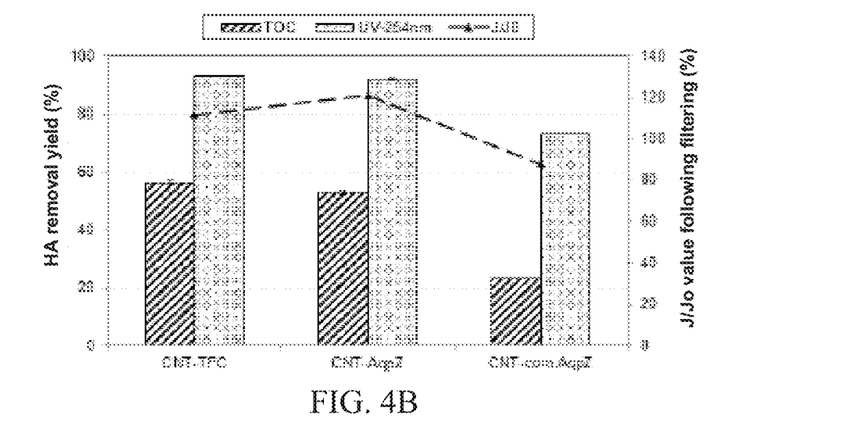
FIG. 4B: View of the flux changes depending on membrane contamination and organic agent retention belonging to CNT-TFC, CNT-AqpZ and CNT-com.AqpZ membranes.
Figure 4C:
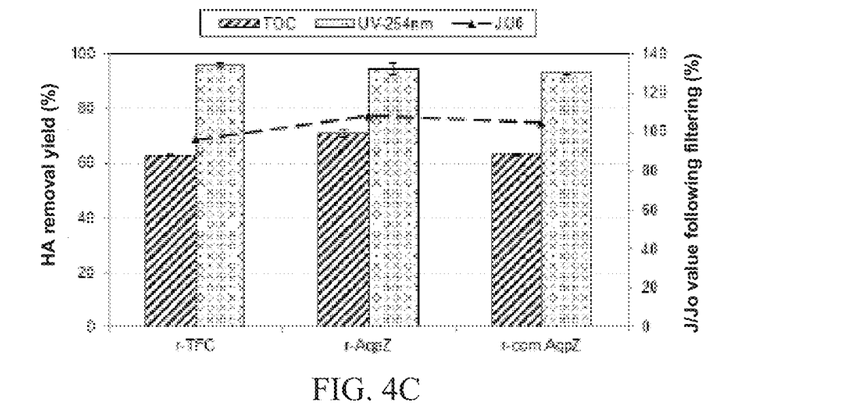
FIG. 4C: View of the flux changes depending on membrane contamination and organic agent retention belonging to r-TFC, r-AqpZ and r-com.AqpZ membranes.
Figure 5A:
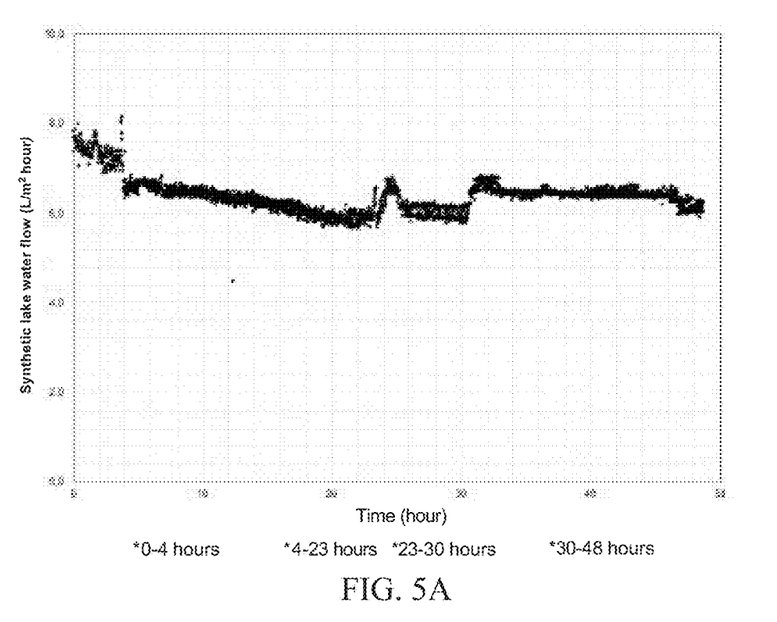
FIG. 5A: Graphical view of the synthetic lake water flux
Figure 5B:
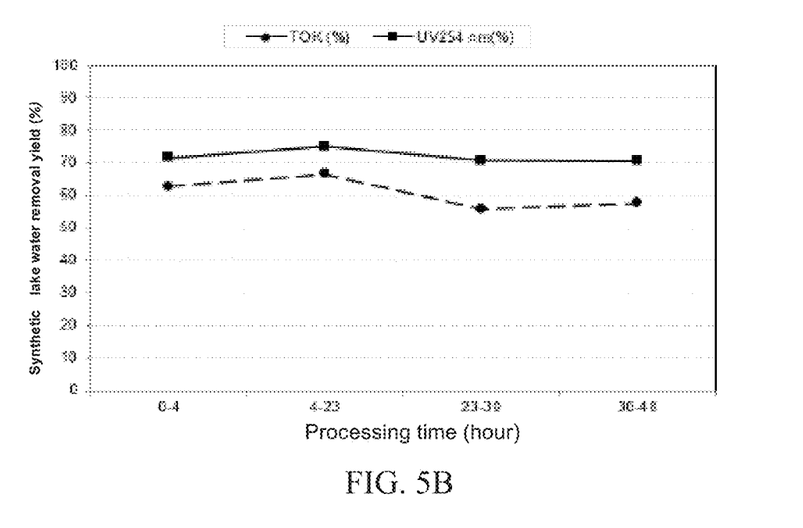
FIG. 5B: Graphical view of the synthetic lake water removal efficiency.
Figure 6A:
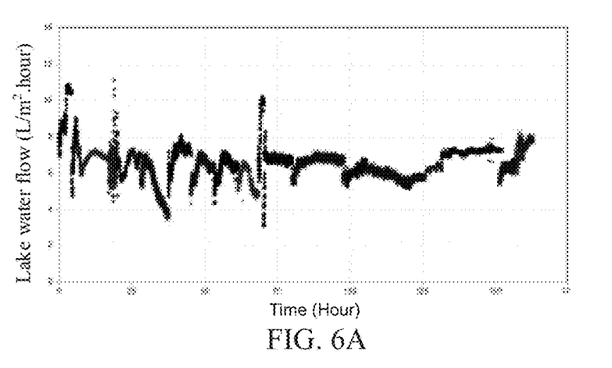
FIG. 6A: Graphical view of the lake water flux.
Figure 6B:
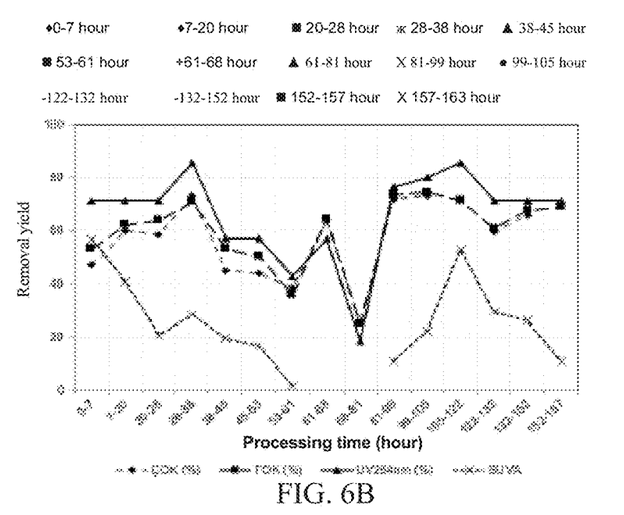
FIG. 6B: Graphical view of the removal efficiency.
Figure 6C:
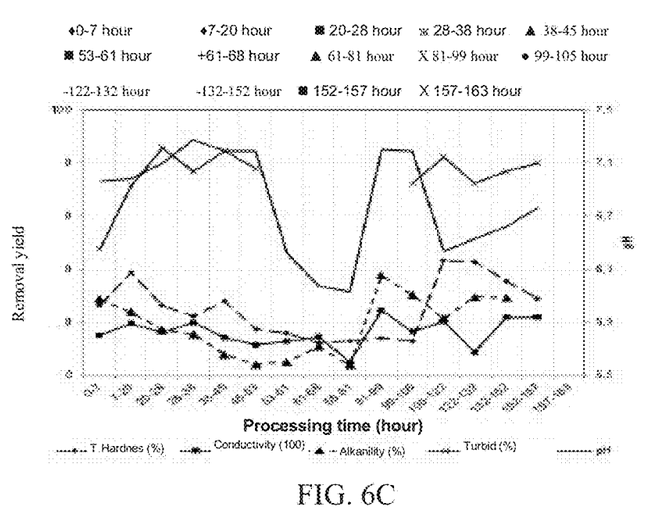
FIG. 6C: Graphical view of the removal efficiency.

The membrane area was increased from 26 cm$^2$ to 280 cm$^2$ and the water purification performance was evaluated from this membrane area by comparing both synthetic water and the water sample obtained from the lake water of Ömerli barrage. The results of this comparison were given in FIG. 5A and FIG. 5B.

When aquaporin protein integration is carried out using reinforced hollow fiber membranes in the invention, increase in the strength and flux of membranes was observed. As a result several benefits were gained. First of all by means of the Aquaporin addition, increase was observed in membrane flux and as a result lower pressure is applied to obtain flux similar to other hollow fiber nanofiltration membranes. Aquaporin protein integrated reinforced membranes increased resilience of membranes to higher pressures. This shows that the usage of membranes in processes that are subject to high pressure such as reverse osmosis and nanofiltration could be advantageous.

REFERENCES

1. Cadotte, J. E.; Reverse Osmosis Membrane. U.S. Pat. No. 4,039,440, 1977, Cadotte, J. E.; Peterson, R. J. (1981) Thin film composite reverse osmosis membranes: origin, development, and recent advances. In: Turbak, A. F. (Ed.) Synthetic Membranes. Vol: I; ACS: Washington, DC, U.S.A.
2. M. Kumar, M. Grzelakowski, J. Zilles, M. Clark and W. Meier, Proc. Natl. Acad. Sci. U.S.A., 2007, 104, 20719-20724.

What is claimed is:

1. A production method of aquaporin Z integrated membranes using different hollow fiber reinforced membranes, wherein the different hollow fiber reinforced membranes comprise a reinforced support layer containing 16% polysulfone, 10% polyvinyl pyrrolidone, Molecular weight: 40 kilo Daltons (kDa kilo Daltons), 74% n-methyl pyrrolidone, and polyester (PET) textile yarn, the production method comprising the following steps:
    dissolving dioleoylphosphocholine lipid in chloroform,
    using the dioleoylphosphocholine lipid and evaporating the chloroform present in a solution having 0.1% dioleoylphosphocholine concentration by weight in a nitrogen medium,
    adding 10 mM phosphate buffer solution into the dioleoylphosphocholine lipid,
    adding 1% aquaporin concentration by weight into liposomes,
    adding 1% dodecylmaltoside detergent into the liposomes, for increasing a reconstitution process of aquaporins into the liposomes to obtain aquaporin reconstituted liposomes,
    using biobeads consisting of neutral, porous styrene divinylbenzene beads to remove the 1% dodecylmaltoside detergent from the nitrogen medium,
    passing the solution through 200 nm polytetrafluoroethylene membranes by using a mini extruder to ensure the aquaporin reconstituted liposomes have similar sizes,
    using an interfacial surface polymerization technique to provide a polyamide layer between two phases to settle an aquaporin protein into three different support layers, wherein the three different support layers are an only polymeric layer, a nanocomposite layer and a reinforced layer,
    dissolving 2% piperazine in water and 0.2% trinnesoyl chloride in cyclohexane to carry out the interfacial surface polymerization technique,
    adding the aquaporin reconstituted liposomes, wherein the aquaporin reconstituted liposomes were prepared as 0.1%, into the solution with the 2% piperazine to obtain a mixed solution of the 2% piperazine and the aquaporin reconstituted liposomes,
    immersing the different hollow fiber reinforced membranes initially into the mixed solution for 2 minutes,
    passing the different hollow fiber reinforced membranes through 1 atmosphere pressure nitrogen gas for 1 minute to remove non-reacted piperazine monomers available on a surface from a membrane,
    leaving the different hollow fiber reinforced membranes obtained in cyclohexane solution for 1 minute and immersing the different hollow fiber reinforced membranes into a trimesoyl chloride solution and leaving the different hollow fiber reinforced membranes here for 1 minute, and keeping the different hollow fiber reinforced membranes in a drying oven for 5 minutes at 50° C., and
    obtaining an aquaporin Z integrated membrane.

* * * * *